United States Patent
Najork

(10) Patent No.: US 7,818,334 B2
(45) Date of Patent: Oct. 19, 2010

(54) QUERY DEPENDANT LINK-BASED RANKING USING AUTHORITY SCORES

(75) Inventor: Marc A. Najork, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 361 days.

(21) Appl. No.: 11/975,790

(22) Filed: Oct. 22, 2007

(65) Prior Publication Data

US 2009/0106231 A1    Apr. 23, 2009

(51) Int. Cl.
*G06F 7/00* (2006.01)
*G06F 17/30* (2006.01)

(52) U.S. Cl. .......................... 707/765; 707/776

(58) Field of Classification Search .............. 707/1–10, 707/100–104.1, 200–206, 600–831
See application file for complete search history.

(56) References Cited

U.S. PATENT DOCUMENTS

| | | | |
|---|---|---|---|
| 6,321,220 B1 * | 11/2001 | Dean et al. ................. | 707/3 |
| 6,560,600 B1 * | 5/2003 | Broder ........................ | 707/7 |
| 6,778,997 B2 | 8/2004 | Sundaresan et al. | |
| 7,080,073 B1 | 7/2006 | Jiang et al. | |
| 7,117,207 B1 | 10/2006 | Kerschberg et al. | |
| 7,243,102 B1 | 7/2007 | Naam et al. | |
| 2004/0002973 A1 | 1/2004 | Chaudhuri et al. | |
| 2006/0173830 A1 | 8/2006 | Smyth et al. | |
| 2006/0224565 A1 | 10/2006 | Ashutosh et al. | |
| 2007/0118521 A1 | 5/2007 | Jatowt et al. | |
| 2007/0143263 A1 | 6/2007 | Agrawal et al. | |
| 2007/0143273 A1 | 6/2007 | Knaus et al. | |

OTHER PUBLICATIONS

Caverlee et al., Link-Based Ranking of the Web with Source-Centric Collaboration, 2006, IEEE, 1-10.*
Jie et al., Using a Layered Markov Model for Distributed Web Ranking Computation, Jun. 20, 2005, IEEE, 533-542.*
Alhalabi, et al., "Search Engine Ranking Efficiency Evaluation Tool", Date: Jun. 2007, vol. 39, Issue: 2, pp. 97-101.
Gevrey, et al., "Link-based Approaches for Text Retrieval", pp. 1-7.
Mihalcea Rada, "Graph-based Ranking Algorithms for Sentence Extraction, Applied to Text Summarization", pp. 1-4.
Ramadhan, et al., "A Heuristic Based Approach for Increasing the Page Ranking Relevancy in Hyperlink Oriented Search Engines: Experimental Evaluation", International Journal of Theoretical and Applied Computer Sciences, Date: 2006, vol. 1, Issue: 1, pp. 49-62.

* cited by examiner

*Primary Examiner*—Jean B Fleurantin

(57) ABSTRACT

Query dependent ranking uses an authority score. A base set is determined as the union of a result set to a received query, an inlinking-set, and an outlinked-set. The inlinking-set is determined by sampling a predetermined number of uniform resource locators (URLs) linking to each result. The outlinked-set is determined by sampling a predetermined number of URLs linked to by each result. A neighborhood graph consists of the vertices of the base set and the edges between the vertices in the base set. An authority score for each URL in the base set is computed using a Stochastic Approach to Link Structure Analysis (SALSA) technique. The authority scores are used to rank the result set.

6 Claims, 4 Drawing Sheets

QUERY DEPENDANT LINK-BASED RANKING USING AUTHORITY SCORES

BACKGROUND

It has become common for users of host computers connected to the World Wide Web (the "web") to employ web browsers and search engines to locate web pages having specific content of interest to users. A search engine, such as Microsoft's Live Search, indexes tens of billions of web pages maintained by computers all over the world. Users of the host computers compose queries, and the search engine identifies pages that match the queries, e.g., pages that include key words of the queries. These pages are known as a "result set." In many cases, particularly when a query is short or not well defined, the result set can be quite large, for example, hundreds or thousands of pages or more. The pages in the result set may or may not satisfy the user's actual information needs. The vast majority of users is not interested in retrieving the entire huge set of resources, and rather is satisfied with a relatively limited number of authoritative results which are highly relevant to the topic of the query.

A number of search engines rely on many features in their ranking techniques. Sources of evidence can include textual similarity between query and documents or query and anchor texts of hyperlinks pointing to documents, the popularity of documents with users measured for instance via browser toolbars or by clicks on links in search result pages, and hyper-linkage between web pages, which is viewed as a form of peer endorsement among content providers. The effectiveness of the ranking technique can affect the relative quality or relevance of pages with respect to the query, and the probability of a page being viewed.

SUMMARY

Ranking of query results may be performed in some implementations according to a method that includes receiving a query and determining a base set in accordance with an inlinking-set. A neighborhood graph may be determined from the base set, where the base set includes the results satisfying the query. An authority score may be determined and the results may be ranked based on the authority score.

In some implementations, a method includes determining a result set based on results of a query and determining a base set in accordance with the result set and an inlinking-set. A neighborhood graph may be determined in accordance with the base set. An authority matrix may be determined and applied to rank the results.

In some implementations, a system includes a search engine that receives a query containing search terms. The search engine may provide a result set responsive to the query. A ranking engine may rank the results within the result set in order of relevance based on a base set and an inlinking-set. A database may store an index of information.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific processes and instrumentalities disclosed. In the drawings.

DETAILED DESCRIPTION

Figure 1:
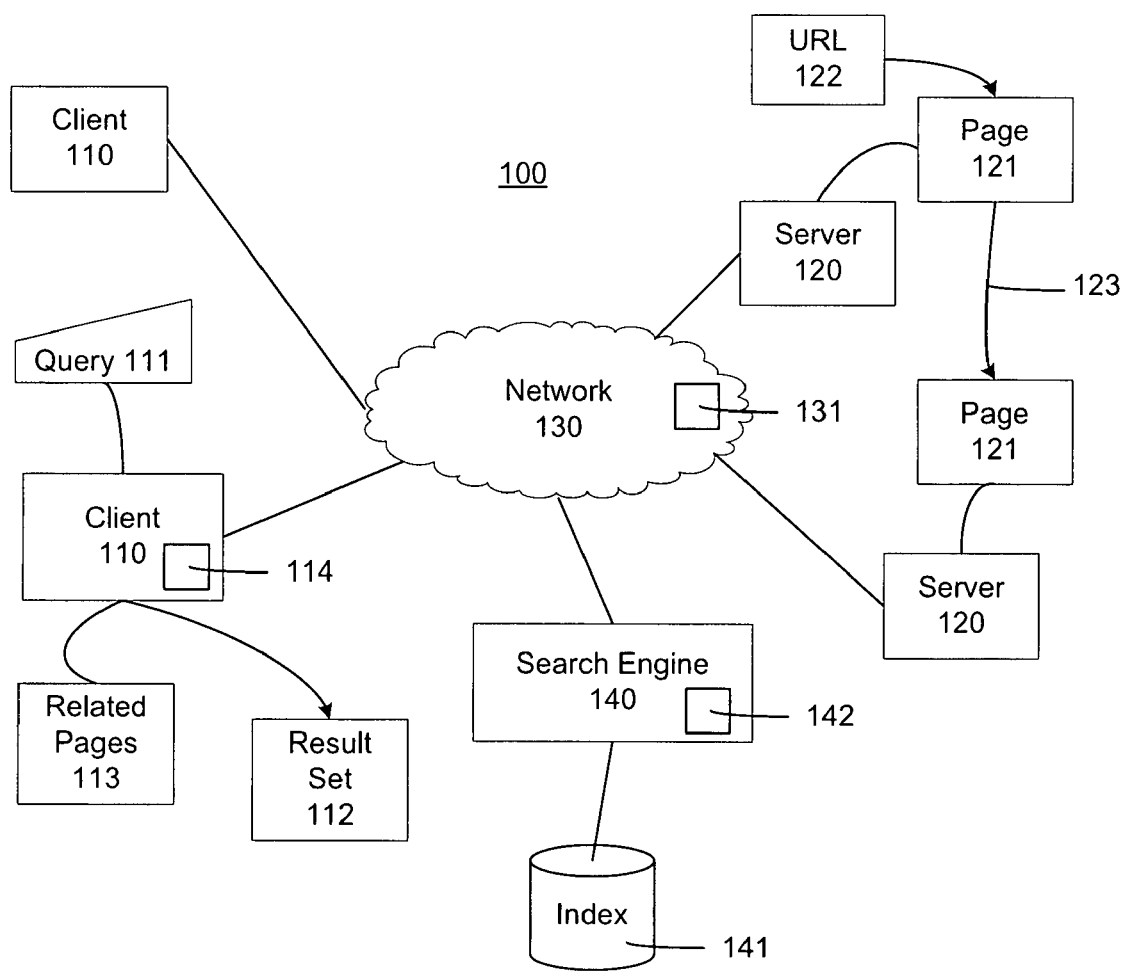
FIG. 1 illustrates an exemplary environment.

FIG. 1 illustrates an exemplary environment 100. The environment includes one or more client computers 110 and one or more server computers 120 (generally "hosts") connected to each other by a network 130, for example, the Internet, a wide area network (WAN) or local area network (LAN). The network 130 provides access to services such as the World Wide Web (the "web") 131. The web 131 allows the client computer(s) 110 to access documents containing text-based or multimedia content contained in, e.g., pages 121 (e.g., web pages or other documents) maintained and served by the server computer(s) 120. Typically, this is done with a web browser application program 114 executing in the client computer(s) 110. The location of each page 121 may be indicated by an associated uniform resource locator (URL) 122 that is entered into the web browser application program 114 to access the page 121. Many of the pages may include hyperlinks 123 to other pages 121. The hyperlinks may also be in the form of URLs.

Although the implementation is described with respect to documents that are pages, it should be understood that the environment can include any linked data objects having content and connectivity that may be characterized.

In order to help users locate content of interest, a search engine 140 may maintain an index 141 of pages in a memory, for example, disk storage, random access memory (RAM), or a database. In response to a query 111, the search engine 140 returns a result set 112 that satisfies the terms (keywords) of the query 111.

Because the search engine 140 stores many millions of pages, the result set 112, particularly when the query 111 is loosely specified, can include a large number of qualifying pages. These pages may or may not be related to the user's actual information needs. Therefore, the order in which the result set 112 is presented to the client 110 affects the user's experience with the search engine 140.

In an implementation, a ranking process may be implemented as part of a search engine 140 within a ranking engine 142. The ranking process may be based upon content analysis, as well as connectivity analysis, to improve the ranking of pages in the result set 112 so that just pages related to a particular topic are identified.

As illustrated in FIG. 1, the pages 121 may be a linked collection. In addition to the textual content of the individual pages, the link structure of such collections may contain information which can be used when searching for authoritative sources. In an implementation, a link can suggest that users visiting page p follow the link and visit page q. This may reflect the fact that pages p and q share a common topic of interest. Such a link is called an informative or authoritative link, i.e., it is the way page p confers authority on page q.

Informative links may provide a positive assessment of page q's contents from a source outside the control of the author of page q.

The vicinity of a page 121 may be defined by the hyperlinks that connect the page 121 to other pages. A page 121 may point to other pages, and the page 121 may be pointed to by other pages. Close pages are directly linked, and farther pages are indirectly linked via intermediate pages. This connectivity may be expressed as a graph where nodes represent the pages (e.g., a URL) and the directed edges represent the links (e.g., hyperlinks). The vicinity of the pages in the result set, up to a certain distance, may be called the neighborhood graph.

Some ranking techniques attempt to identify "hub" pages and "authority" pages in the neighborhood graph for a user query. Hubs and authorities exhibit a mutually reinforcing relationship. To define a neighborhood graph, it is helpful to introduce a sampling operator and the concept of a link-selection predicate. Given a set A, the notation $S_n[A]$ draws n elements that are consistently sampled or uniformly sampled at random from A; $S_n[A]=A$ if $|A| \leq n$.

Given a web graph (V,E) with a vertex set V and an edge set E, a link section predicate P takes an edge (u, v) E. In an implementation, the following three link section predicates may be used:

All(u, v) true
IH(u, v) host(u)≠host(v)
ID(u, v) domain(u)≠domain(v)

where host(u) denotes the host of URL u, and domain(u) denotes the domain of URL u. All is true for all links, whereas IH is true only for links between web pages on different hosts ("inter-host links"), and ID is true only for links on web pages in different domains ("inter-domain links").

The outlinked-set of the result set R with respect to a link-selection predicate P may be defined as:

$$O^P = \underset{u \in R}{Y} \{v \in V : (u,v) \in E \wedge P(u,v)\}$$

The inlinking-set of the result set R with respect to a link-selection predicate P and a sampling value s may be defined as:

$$I_s^P = \underset{v \in R}{Y} S_s[\{u \in V : (u,v) \in E \wedge P(u,v)\}]$$

The base set B of the result set R with respect to P and s may be defined as:

$$B_s^P = R \cup I_s^P \cup O^P$$

The neighborhood graph may be defined as follows:

$$(B_s^P, N_s^P)$$

The neighborhood graph may have the base set as its vertex set and an edge set containing those edges in E that are covered by the base set and permitted by P:

$$N_s^P = \{(u,v) \in E : u \in B_s^P \wedge v \in B_s^P \wedge P(u,v)\}$$

To simplify the notation, B denotes the base set and N denotes the neighborhood edge set. As such, in(v) may be used to denote the neighborhood graph in-degree of v as follows:

$$in(v) = |\{u \in B : (u,v) \in N\}|$$

and out(u) may be used to define the neighborhood graph out-degree of u as follows:

$$out(u) = |\{v \in B : (u,v) \in N\}|$$

The "Stochastic Approach for Link-Structure Analysis" (SALSA) technique examines random walks on graphs derived from the link structure among pages in a search result. SALSA is a query-dependent technique and takes the result set to a query as input and expands it to include pages at distance one in the web graph. SALSA is based upon the theory of Markov chains, and relies on the stochastic properties of random walks performed on a collection of sites to compute a hub score and an authority score for each node in the neighborhood graph. The SALSA technique initially assumes uniform probability over all pages, and relies on the random walk process to determine the likelihood that a particular page will be visited.

Authorities are pages that are recognized as providing significant, trustworthy, and useful information on a topic. A high authority score is indicative of relevant content. Hubs are index pages that provide many useful links to relevant content pages (topic authorities). A high hub score is indicative of links to documents with relevant content.

In an implementation, SALSA computes the authority score A(u), estimating how authoritative u is on the topic induced by the query, as follows:

1. Let $B^A$ be $\{u \in B : in(u) > 0\}$
2. For all $u \in B$:

$$A(u) := \begin{cases} \frac{1}{|B^A|} & \text{if } u \in B^A \\ 0 & \text{otherwise} \end{cases}$$

3. Repeat until A converges:
   (a) For all $u \in B^A$:

$$A'(u) := \sum_{(v,u) \in N} \sum_{(v,w) \in N} \frac{A(w)}{out(v) in(w)}$$

(b) For all $u \in B^A$: A(u):=A'(u)

Other implementations to compute authority scores may be implemented. Such other implementations may characterize the authority vector as the first Eigenvector of an "authority matrix" that is defined by the edges in the neighborhood graph (and the implied in-and out-degrees of the vertices in the graph).

The SALSA technique may be generalized to sample n out-linkers of each result set vertex, as well as m in-linkers. Thus, setting n to infinity results in the original SALSA technique while setting n=0 results in a base set B as follows:

$$B_s^P = R \cup I_s^P$$

In other implementations, various parameterizations of m and n may be defined to determine ranking. In a particular implementation, the parameterization of m=2 and n=1 provides optimal ranking results.

For example, the outlinked-set of the result set R with respect to a link-selection predicate P may be defined as:

$$O_n^P = \underset{u \in R}{Y} S_n\{v \in V : (u,v) \in E \wedge P(u,v)\}$$

The inlinking-set of the result set R with respect to a link-selection predicate P and a sampling value s may be defined as:

$$I_m^P = \underset{v \in R}{Y} S_m[\{u \in V : (u, v) \in E \wedge P(u, v)\}]$$

The base set B of the result set R with respect to P and s may be defined as:

$$B_{m,n}^P = R \cup I_m^P \cup O_n^P$$

The neighborhood graph may have the base set as its vertex set and an edge set containing those edges in E that are covered by the base set and permitted by P:

$$N_{m,n}^P = \{(u,v) \in E : u \in B_{m,n}^P \wedge v \in B_{m,n}^P \wedge P(u,v)\}$$

As with the description above, B denotes the base set and N denotes the neighborhood edge set. As such, in(v) may be used to denote the neighborhood graph in-degree of v as follows:

$$in(v) = |\{u \in B : (u,v) \in N\}|$$

and out(u) may be used to define the neighborhood graph out-degree of u as follows:

$$out(u) = |\{v \in B : (u,v) \in N\}|$$

In some implementations, to determine ranking, authority scores are determined, but not hub scores. Such an implementation provides a computation that is faster than SALSA, while being more effective than SALSA in determining ranking. This implementation may also be more efficient for lower sampling values. Depending on the performance metric and document cut-off value used, the optimal number of sampled back-links per result may be either one or two. This behavior may apply to the All version as well.

Thus, as described above, the implementations of the generalized SALSA technique include one or more of the following: computing authority scores and not computing hub score to rank results, sampling the out-linkers of each result set vertex, sampling zero out-linkers (n=0) of each result set vertex, and sampling zero in-linkers (i.e., m=0).

Figure 2:
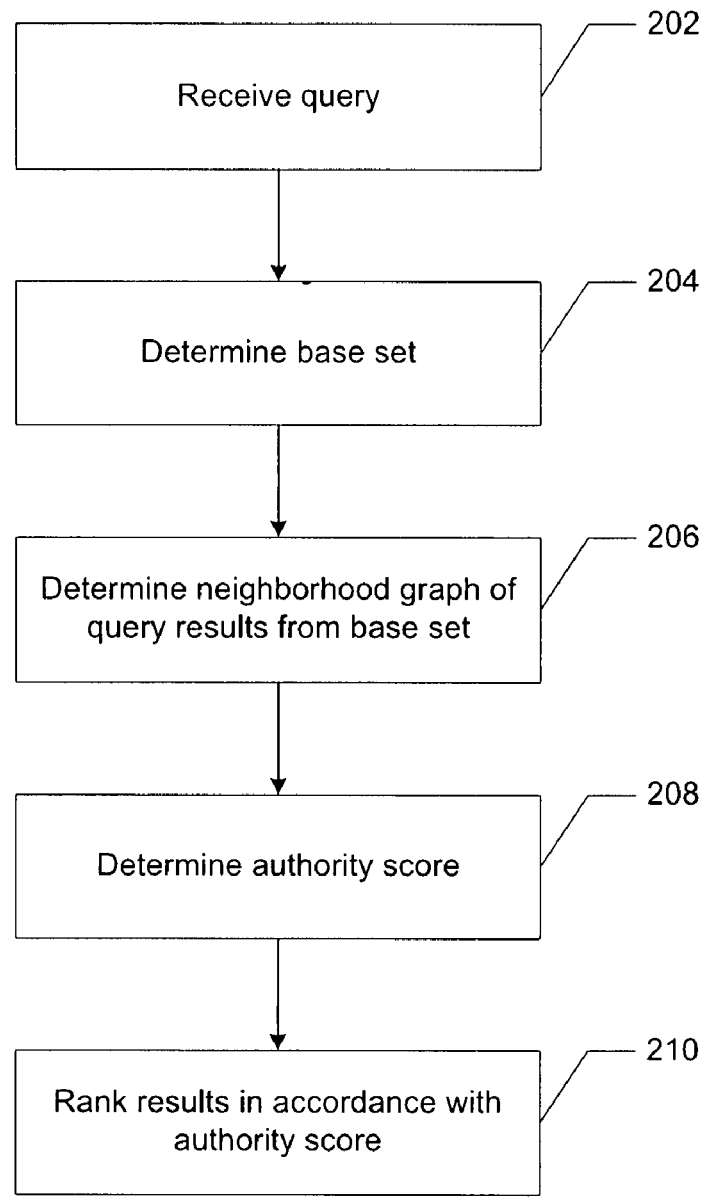
FIG. 2 illustrates an exemplary process of ranking results to a query.

FIG. 2 illustrates an exemplary process 200 of ranking results to a query. At stage 202, a query may be received. In an implementation, a query may be received by the search engine 140 in FIG. 1.

In an implementation, at stage 204, a base set may be determined. A base set may be determined from the inlinking-set of the result set by setting m to a non-zero value and by setting n=0. In other implementations, various combinations of n and m may be used. At stage 206, a neighborhood graph of query results may be determined. In an implementation, the search engine 140 may access the index 141 to determine results to the query where the results are pages (nodes) connected by hyperlinks (edges) based on the base set.

At stage 208, an authority score may be determined. In an implementation, the authority score for each node (e.g., page) may be determined to estimate how authoritative each node is on the topic of the query. At stage 210, the results may be ranked. By applying the authority score to each node, a page ranking of the query results may be determined.

Figure 3:
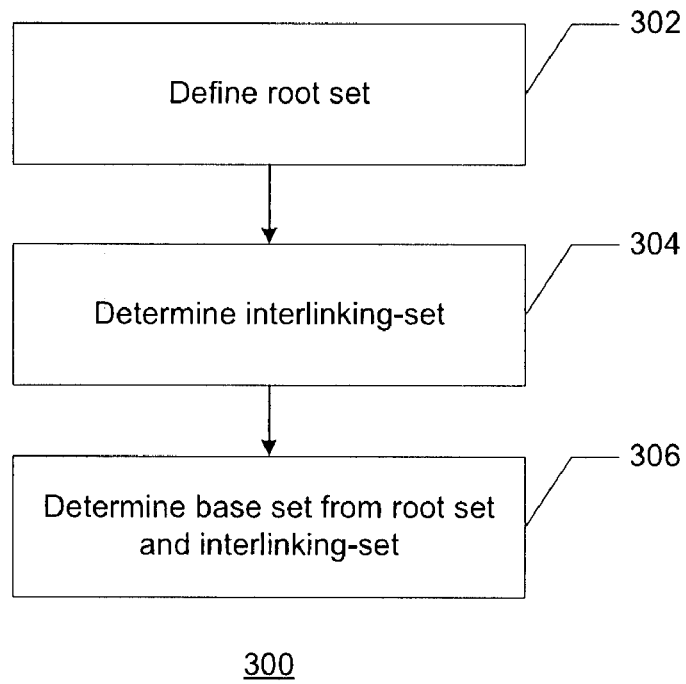
FIG. 3 illustrates an exemplary process of determining a base set.

FIG. 3 illustrates an exemplary process 300 of determining a base set. A stage 302, a result set may be defined. In an implementation, the result set may be the resulting URLs to a query input by a user. At stage 304, an interlinking-set may be determined. In an implementation, a function may be defined with respect to a link-selection predicate and a sampling value of the result set.

At stage 306, a base set may be determined. In an implementation, the base set may be determined as the union of the result set and the interlinking set.

Figure 4:
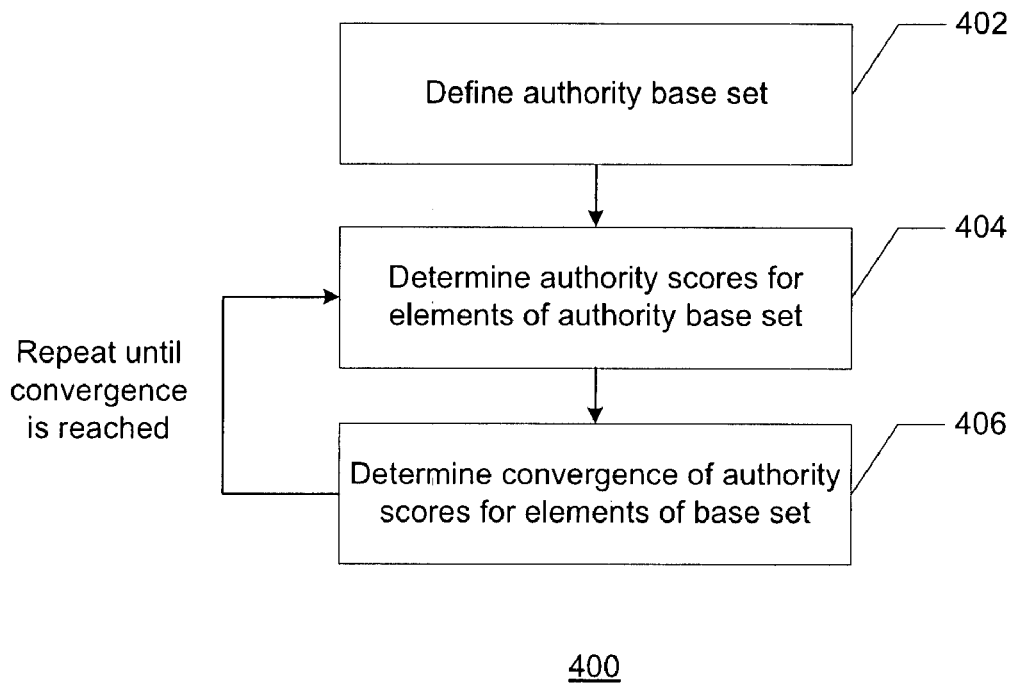
FIG. 4 illustrates an exemplary process of determining an authority score.

FIG. 4 illustrates an exemplary process 400 of determining an authority score. At stage 402, an authority base set may be defined. In an implementation, the authority base set may be pages v in the base set for which in(v) is greater than zero. This is determined because a random walk may be performed on a neighborhood graph by repeatedly taking a step backward (which requires an incoming edge) followed by taking a step forward. Taking a step forward requires an outgoing edge, and there is at least one such edge, namely the edge that was just traversed backward.

At stage 404, an updated authority score A'(u) is determined. In an implementation, A'(u) may be determined for each URL u in the base set where the neighborhood graph in-degree is greater than zero. For the vertices that have no incoming edge, the authority score is set to zero. The vertices that do have an incoming edge may receive a share of the authority scores of the vertices that lead to them through a backward step followed by a forward step. A backward step followed by a forward step may involve three vertices: the starting vertex w, the intermediate vertex v, and the ending vertex u. Furthermore, it may involve two edges: an edge from v to w (which is traversed backward) and an edge from v to u (which is traversed forward). In a random walk starting at w, the probability that the edge from v to w may be chosen to be traversed backward is 1/in(w), since there are in(w) edges to choose from. Likewise, the probability that the edge from v to u may be chosen to be traversed forward is 1/out(v), since there are out(v) edges to choose from. As such, the probability that a transition from v over w to u occurs is 1/(in(w)out(v)). Therefore, the share of w's authority score A(w) transmitted over this path to u may be defined as A(w)/(in(w)out(v)). Thus, the updated authority score A'(u) of u may be set to the sum of all authority score shares over all possible paths from some w back to some v and forward to u.

At stage 406, the difference between the previous and the updated authority score vector is determined. If the authority score vectors are substantially identical, the computation of the authority scores terminates; otherwise stage 404 is repeated.

For each URL u, the authority score determined by the exemplary processes may be used to rank the results to a user query.

Exemplary Computing Arrangement

Figure 5:
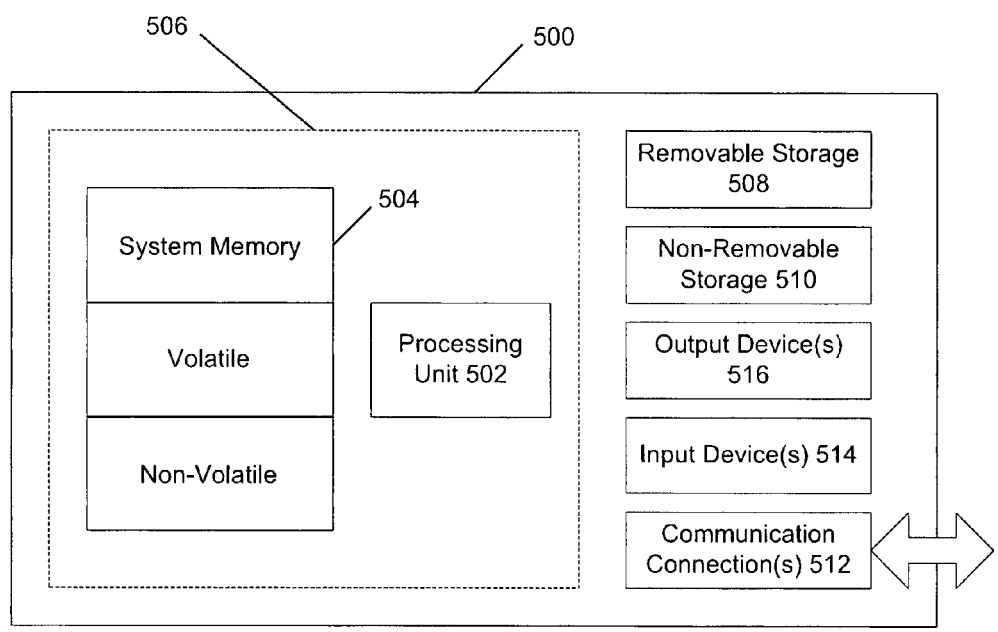
FIG. 5 shows an exemplary computing environment.

FIG. 5 shows an exemplary computing environment in which example implementations and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as RAM), non-volatile (such as read-only memory (ROM), flash memory, etc.), or some combination of the two. This most basic configuration is illustrated in FIG. 5 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer readable media. Computer readable media can be any available media that can be accessed by device 500 and include both volatile and non-volatile media, and removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

Computing device 500 may contain communications connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method comprising:
   determining a base set including results satisfying a query, the base set being further determined as the union of a result set, an inlinking-set, and an outlinked-set;
   determining the inlinking-set by sampling for each result a predetermined number of vertices linking to that result;
   determining the outlinked-set by sampling for each result a predetermined number of vertices linked to by that result;
   determining a neighborhood graph as having the base set as a vertex set and an edge set containing edges that are covered by the base set;
   computing authority scores in accordance with the neighborhood graph; and
   ranking the results in accordance with the authority scores using a ranking engine executing on a computing device, wherein the predetermined number of vertices sampled for each result is zero.

2. The method of claim 1, wherein a Stochastic Approach for Link-Structure Analysis (SALSA) technique is applied to the neighborhood graph to compute authority scores.

3. A computer-implemented method comprising:
   determining a result set in accordance with results to a query;
   determining a base set in accordance with the result set, an inlinking-set, and an outlinked-set, the outlinked-set being determined by sampling for each result a predetermined number of vertices that a result links to, the base set further being determined as the union of the result set, the inlinking-set, and the outlinked-set;
   determining the inlinking-set by sampling, for each result, a predetermined number of vertices to link to the result;
   determining a neighborhood graph as having the base set as a vertex set and an edge set containing edges that are covered by the base set;
   determining an authority matrix in accordance with the neighborhood graph;
   computing authority scores from the authority matrix; and
   ranking the results in accordance with the authority score using a ranking engine executing on a computing device.

4. A computing system, comprising:
   a search engine that receives a query containing search terms and provides a result set responsive to the query;
   a database that stores an index of information; and a ranking engine that ranks results within the result set in order of relevance based on a base set, an inlinking-set, and an outlinked-set, creates a neighborhood graph of the results, computes authority scores according to the neighborhood graph, and ranks the results in accordance with the authority scores, wherein a predetermined number of links in an outlinked-set of each result is sampled, wherein the inlinking-set is defined in accordance with a sampling value, wherein the neighborhood graph is determined as having the base set as a vertex set, and an edge set containing edges that are covered by the base set, wherein the results are ranked based on a query-dependent determination of the edges of the neighborhood graph, and wherein a hub score is unutilized by the ranking engine to rank the results.

5. The system of claim 4, wherein a link section predicate is defined that selects all links, inter-host links, or inter-domain links.

6. The system of claim 4, wherein a Stochastic Approach for Link-Structure Analysis (SALSA) technique is applied to the neighborhood graph by the ranking engine to rank the results.

* * * * *